(12) United States Patent
Cornwall

(10) Patent No.: US 8,184,986 B2
(45) Date of Patent: May 22, 2012

(54) DETECTION ARRANGEMENT

(76) Inventor: Remi Oseri Cornwall, London (GB)

( * ) Notice: Subject to any disclaimer, the term of this patent is extended or adjusted under 35 U.S.C. 154(b) by 847 days.

(21) Appl. No.: 11/793,104

(22) PCT Filed: Dec. 16, 2005

(86) PCT No.: PCT/GB2005/004860
§ 371 (c)(1),
(2), (4) Date: Apr. 28, 2008

(87) PCT Pub. No.: WO2006/064248
PCT Pub. Date: Jun. 22, 2006

(65) Prior Publication Data
US 2009/0097650 A1    Apr. 16, 2009

(30) Foreign Application Priority Data
Dec. 16, 2004    (GB) .................................. 0427581.4

(51) Int. Cl.
*H04B 10/06*    (2006.01)
*H04B 10/30*    (2006.01)

(52) U.S. Cl. ........................................ 398/140; 398/212

(58) Field of Classification Search ............... 398/40, 398/140, 212
See application file for complete search history.

(56) References Cited

U.S. PATENT DOCUMENTS

| | | |
|---|---|---|
| 5,822,100 A | 10/1998 | Robinson et al. |
| 6,028,935 A | 2/2000 | Rarity et al. |
| 6,057,541 A | 5/2000 | Steenblik |
| 6,473,719 B1 | 10/2002 | Steenblik |
| 6,725,668 B1 | 4/2004 | Cornwall |
| 2003/0133714 A1 | 7/2003 | Gat |

FOREIGN PATENT DOCUMENTS

| | | |
|---|---|---|
| EP | 1825615 | 2/2011 |
| GB | 2397452 | 7/2005 |
| JP | 2000-515642 | 11/2000 |
| WO | WO 97/35388 | 9/1997 |

OTHER PUBLICATIONS

International Preliminary Report on Patentability, including a Written Opinion, from PCT/GB2005/004860 (mailed Jun. 28, 2007).
International Search Report from International Application No. PCT/GB2005/004860, filed Dec. 16, 2005 (mailed Sep. 5, 2006).
Napasab et al., "Polarization Recombining: A New Automatic Polarization Control Scheme for Heterodyne or Homodyne Optical Receivers," *Journal of Optical Communications*, vol. 9, No. 9, pp. 102-107 (Sep. 1988).

(Continued)

*Primary Examiner* — Leslie Pascal
(74) *Attorney, Agent, or Firm* — Klarquist Sparkman, LLP

(57) ABSTRACT

Exemplary embodiments of detection and transmission arrangements are disclosed herein. For example, some of the disclosed embodiments comprise a splitter, a detector, first and second paths defined between the splitter and the detector, and a manipulation arrangement. In certain embodiments, the splitter is arranged to direct an incoming particle along the first or second path depending upon the value of a parameter of the incoming particle. In particular embodiments, the manipulation arrangement is located on at least one of the first and second paths, so that, if a particle in a superposition of values of the parameter impinges on the splitter and a wavefunction of the particle is directed along both the first and second paths, the manipulation arrangement will act on the wavefunction to allow interference, at or near the detector, between the portions of the wavefunction that were directed along the first and second paths.

41 Claims, 5 Drawing Sheets

OTHER PUBLICATIONS

Shan, "Quantum Collapse, Consciousness and Superluminal Communication," *Foundations of Physics Letters*, vol. 17, No. 2, pp. 167-182 (Apr. 2004).

Aspect et al., "Experimental Realization of Einstein-Podolsky-Rosen-Bohm *Gedankenexperiment*: A New Violation of Bell's Inequalities," *Physical Review Letters*, vol. 49, No. 2, pp. 91-94 (Jul. 12, 1982).

Bell, "On the Einstein Podolsky Rosen Paradox," *Physics*, vol. 1, pp. 195-200 (Nov. 1964).

Bohr, "Can Quantum-Mechanical Description of Physical Reality be Considered Complete?," *Phys. Rev.*, vol. 48, pp. 696-702 (Oct. 1935).

Einstein et al., "Can Quantum-Mechanical Description of Physical Reality Be Considered Complete?," *Phys. Rev.*, vol. 47, pp. 777-780 (May 1935).

Franson, "Bell Inequality for Position and Time," *Phys. Rev. Lett.*, vol. 62, No. 19, pp. 2205-2208 (May 1989).

Kwiat et al., "Interaction-Free Measurement," *Phys. Rev. Lett.*, vol. 74, No. 24, pp. 4763-4766 (Jun. 1995).

Kwiat et al., "Quantum Seeing in the Dark," *Scientific American*, pp. 72-78 (Nov. 1996).

Tittel et al., "Violation of Bell Inequalities by Photons More Than 10 km Apart," *Phys. Rev. Lett.*, vol. 81, Issue 17, pp. 3563-3566 (Oct. 1998).

Wikipedia, "Bell test experiments," 6 pp., downloaded from http://en.wikipedia.org/wiki/Bell_test_experiments (document marked Jun. 8, 2011).

Wikipedia, "Quantum entanglement," 6 pp., downloaded from http://en.wikipedia.org/wiki/Quantum_entanglement (document marked Aug. 22, 2011).

Zhao et al., "Experimental demonstration of five-photon entanglement and open-destination teleportation," *Letters to Nature*, vol. 430, pp. 54-58 (Jul. 2004).

Zurek, "Decoherence and the Transition from Quantum to Classical—Revisited," *Los Alamos Science*, No. 27, pp. 2-25 (2002).

Barrett et al., "No Signaling and Quantum Key Distribution," *Physical Review Letter*, vol. 95, 4pp. (Jun. 2005).

Communication dated Apr. 2, 2009, from European Patent Application No. 05818669.3, 4 pp.

Communication dated Apr. 28, 2010, from European Patent Application No. 05818669.3, 5 pp.

Communication under Rule 71(3) EPC dated Jul. 29, 2010, from European Patent Application No. 05818669.3, 6 pp.

Examiner's first report dated Oct. 8, 2009, from Australian Patent Application No. 2005315389, 2 pp.

Examiner's report No. 2 dated Dec. 15, 2010, from Australian Patent Application No. 2005315389, 2 pp.

Hall, "Imprecise measurements and non-locality in quantum mechanics," *Physics Letters A*, vol. 125, pp. 89-91 (Nov. 1987).

Ghirardi et al., "Experiments of the EPR Type Involving *CP*-Violation Do not Allow Faster-than-Light Communication between Distant Observers," *Europhysics Letters*, vol. 6, pp. 95-100 (May 1988).

Sanders, "Everyday entanglement: Physicists take quantum weirdness out of the lab," *Science News*, pp. 22-29 (Nov. 2010).

Stefanov et al., "Quantum Correlations with Spacelike Separated Beam Splitters in Motion: Experimental Test of Multisimultaneity," *Physical Review Letters*, vol. 88, 4 pp. (Mar. 2002).

Translation of Notice of Reasons for Rejection dated Feb. 8, 2011, from Japanese Patent Application No. 2007-546185, 3 pp.

Bell, *John S. Bell on the Foundations of Quantum Mechanics*, pp. 74-82, 126-145, and 216-232 (2001).

Bohm, *Wholeness and the Implicate Order*, pp. 65-110 (Jul. 1980).

Brandt, "Quantum Computation: The Grand Mathematical Challenge for the Twenty First Century and the Millennium," *Proc. Am. Math. Soc.*, pp. 75-77, 87, 110-119, 124-126, 146-150, 221-225, and 352 (Jan. 2000).

Nielsen et al., *Quantum Computation and Quantum Information*, pp. 111-117 (2000).

Figure 4
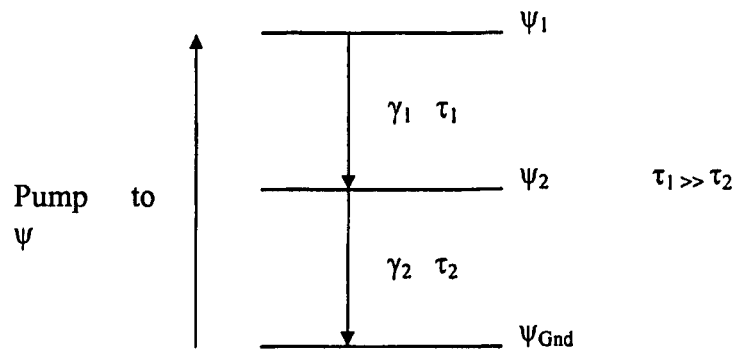
Figure 5
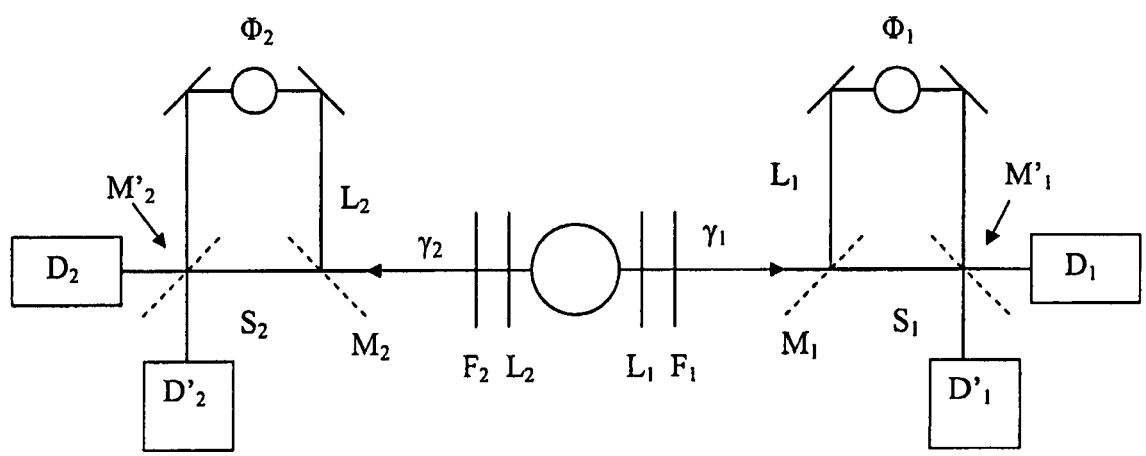
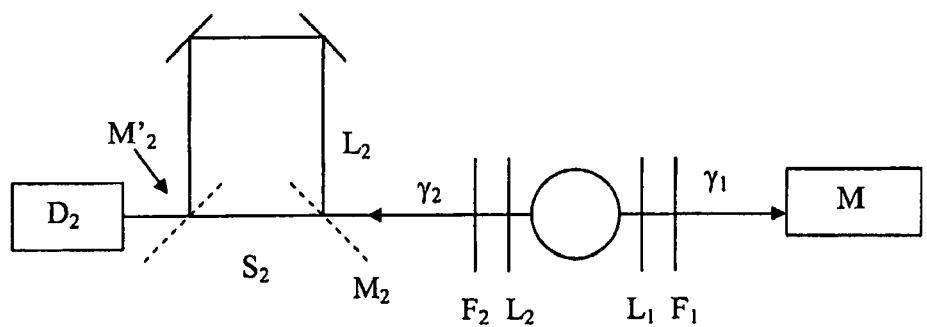
Figure 6

Figure 9
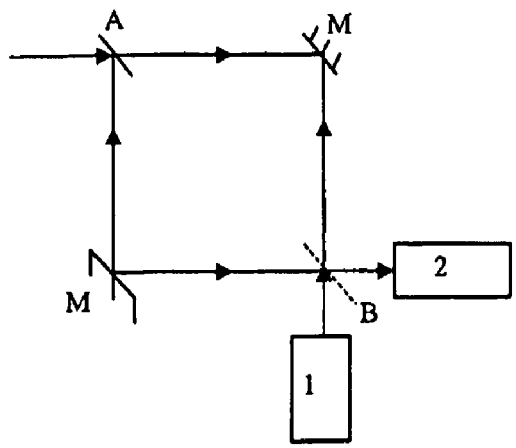
Figure 10a
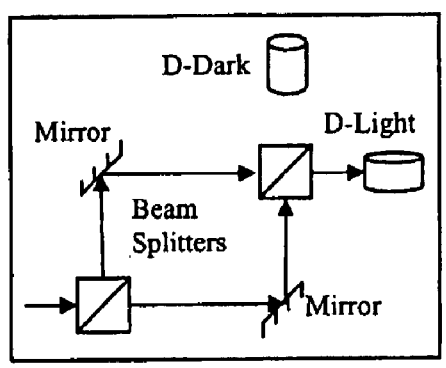
Figure 10b
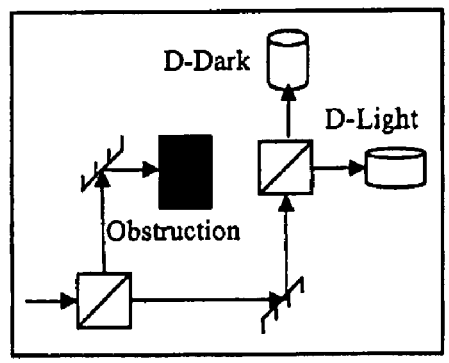
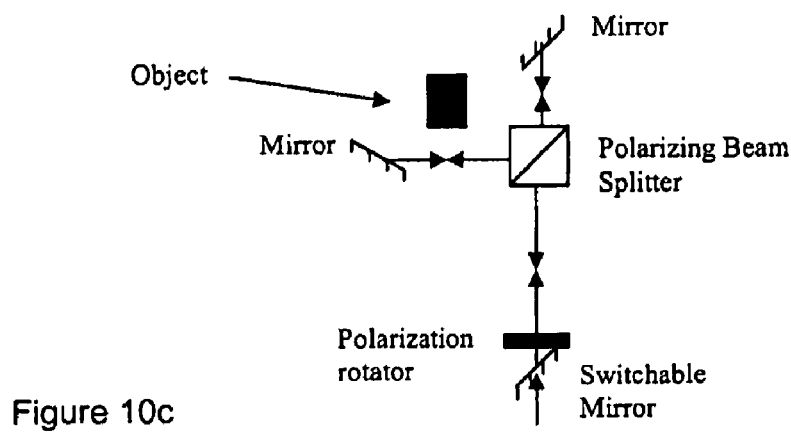
Figure 10c

DETECTION ARRANGEMENT

This invention relates to a detection arrangement and an information transmission arrangement, and in particular to an information transmission arrangement for allowing efficient communication of information.

Swifter transmission of information is desirable in many fields of technology. The ability to transmit information securely is also of great importance in many fields, in particular banking transactions between clearing banks.

It is an object of the present invention to seek to provide a communication arrangement which allows improved speed and security for communication.

Accordingly, one aspect of the present invention provides a detection arrangement comprising: a splitter; a detector, first and second paths being defined between the splitter and the detector and the splitter being arranged to direct an incoming particle along the first or second path depending upon the value of a parameter of the incoming particle; and a manipulation arrangement located on at least one of the first and second paths, so that, if a particle in a superposition of values of the parameter impinges on the splitter and a wavefunction of the particle is directed along both the first and second paths, the manipulation arrangement will act on the wavefunction to allow interference, at or near the detector, between the portions of the wavefunction that were directed along the first and second paths.

Advantageously, the splitter is a polarising splitter and the parameter of the incoming particle is the direction of polarisation of the incoming particle.

Preferably, the polarising splitter is arranged to direct particles having a first direction of polarisation along the first arm, and particles having a second direction of polarisation along the second arm, wherein the first and second directions of polarisation are different from one another by approximately 90°.

Conveniently, the manipulation arrangement comprises a rotator arrangement provided on the first path and operable to alter the direction of polarisation of polarised particles passing along the first path.

Advantageously, the rotator arrangement is operable to alter the direction of polarisation of polarised particles passing along the first path by approximately 90°.

Alternatively, first and second rotator arrangements are provided on the first and second paths respectively and are operable to alter the direction of polarisation of polarised particles passing along the paths.

Preferably, the rotator arrangements are operable to alter the directions of polarisation of the particles so that the difference between the directions of polarisation of particles passing along the paths is altered by 90°.

Conveniently, the manipulation arrangement comprises a manipulation particle source that is arranged to emit particles in such a way that they may interfere with a portion of a particle wavefunction passing along the first path, to give a resultant wavefunction that has at least a component having a direction of polarisation approximately equal to that of a portion of a particle wavefunction directed along the second path by the polarising splitter.

Advantageously, the manipulation arrangement further comprises a further polarising splitter located on the first path and arranged to direct an incoming particle towards the detector or in an alternative direction depending upon the direction of polarisation of the incoming particle.

Preferably, the manipulation particle source is arranged to emit particles towards the further polarising splitter, so that particles emitted thereby may interfere with at least a portion of a particle wavefunction that is directed towards the detector by the further polarising splitter.

Conveniently, the manipulation arrangement further comprises a phase alteration component that is arranged to alter the effective path length of the first path.

Advantageously, the effective lengths of the first and second paths are such that, if a particle in a superposition of values of the parameter impinges on the polarising splitter, a wavefunction of the particle is directed along both the first and second paths and interference occurs between the portions of the wavefunction that were directed along the first and second paths, the interference will be destructive at the detector so no particle will be detected by the detector.

Preferably, if a particle having a single value of the parameter impinges on the polarising splitter and is directed along either the first path or the second path, the particle will be directed to the detector for detection thereby.

Another aspect of the present invention provides an information transmission arrangement comprising: an information particle source; a filter provided at a first location, the filter being configured only to allow particles having a certain value of the parameter to pass therethrough; and a detection arrangement provided at a second location, the detection arrangement being operable to distinguish between an incident particle having a determined value of the parameter and an incident particle in a superposition of values of the particle.

Conveniently, the detection arrangement is a detection arrangement according to any of the above.

Advantageously, the parameter is the direction of polarisation of a particle, and the filter is a polarising filter.

Preferably, the information particle source is operable to emit particle pairs, one particle in each pair being directed towards the filter and the other particle in each pair being directed towards the detection arrangement.

Conveniently, the filter may be moved between an on-path position, in which the one particle in each particle pair passes though the filter, and an off-path position, in which the one particle in each particle pair does not pass though the filter.

Advantageously, the particles emitted by the information particle source are matter particles.

A further aspect of the present invention provides an information transmission arrangement comprising: an information particle source, operable to emit pairs of particles, a first particle in a pair being emitted towards a first location and a second particle in a pair being emitted towards a second location; a filter provided at the first location, the filter being moveable between an on-path position, in which the one particle in each particle pair is absorbed by the filter, and an off-path position, in which the one particle in each particle pair is not absorbed by the filter; and a detection arrangement provided at the second location, the detection arrangement being operable to distinguish between an incident particle having a relatively short coherence length and an incident particle having a relatively long coherence length.

Preferably, the information particle source comprises a sample of a material having at least a three-level atomic structure, one of the particles of a particle pair being emitted as an electron moves from a first level to a second level within the structure and the other one of the particles of the particle pair being emitted as the electron moves from the second level to a third level within the structure.

Conveniently, the detection arrangement comprises: a splitter; and a detector, first and second paths being defined between the splitter and the detector, a path length of the first path being longer than a path length of the second path, the arrangement being such that, if a particle impinges on the splitter and a wavefunction of the particle is directed along both the first and second paths, the portions of the wavefunction that were directed along the first and second paths may interfere with one another at or near the detector.

Advantageously, the information particle source is operable to emit pairs of particles whose wavefunctions are entangled with one another.

Preferably, the path length from the information particle source to the filter is less than the path length from the information particle source to the detection arrangement.

Conveniently, a pair of path length modules are provided, each of the path length modules having an input and an output and defining a path length therebetween, the path lengths of the path length modules being substantially identical to one another and hidden from an observer of the path length modules, one of the path length modules being placed so that particles travelling from the information particle source to the filter pass therethrough and the other of the path length modules being placed so that particles travelling from the information particle source to the detection arrangement pass therethrough.

Advantageously, the particles emitted by the information particle source are photons.

Another aspect of the present invention provides an information transmission arrangement comprising first and second transmission arrangements to the above arranged so that the filter of the first transmission arrangement is located near the detection arrangement of the second transmission arrangement and the filter of the second transmission arrangement is located near the detection arrangement of the first transmission arrangement.

A further aspect of the present invention provides a method for detecting particles comprising the steps of: providing a detection arrangement according to the above; and directing an incoming particle into the detection arrangement.

Another aspect of the present invention provides a method for transmitting information comprising the steps of: providing a filter configured only to allow particles having a certain value of a parameter to pass therethrough; providing a detection arrangement operable to distinguish between an incident particle having a determined value of the parameter and an incident particle in a superposition of values of the particle; providing an information particle source operable to emit particle pairs, one particle in each pair being directed towards the filter and the other particle in each pair being directed towards the detection arrangement; and moving the filter between an on-path position, in which the one particle in each particle pair passes though the filter, and an off-path position, in which the one particle in each particle pair does not pass though the filter.

Preferably, the detection arrangement is a detection arrangement according to the above.

A further aspect of the present invention provides a method for transmitting information comprising the steps of: providing a filter configured only to absorb particles that are incident thereon; providing a detection operable to distinguish between an incident particle having a relatively short coherence length and an incident particle having a relatively long coherence length; providing an information particle source operable to emit particle pairs, one particle in each pair being directed towards the filter and the other particle in each pair being directed towards the detection arrangement; and moving the filter between an on-path position, in which the one particle in each particle pair passes though the filter, and an off-path position, in which the one particle in each particle pair does not pass though the filter.

Conveniently, the step of providing an information particle source comprises providing a sample of a material having at least a three-level atomic structure, one of the particles of a particle pair being emitted as an electron moves from a first level to a second level within the structure and the other one of the particles of the particle pair being emitted as the electron moves from the second level to a third level within the structure.

Advantageously, the step of providing a detection arrangement comprises providing: a splitter; and a detector, first and second paths being defined between the splitter and the detector, a path length of the first path being longer than a path length of the second path, the arrangement being such that, if a particle impinges on the splitter and a wavefunction of the particle is directed along both the first and second paths, the portions of the wavefunction that were directed along the first and second paths may interfere with one another at or near the detector.

Preferably, the path length from the information particle source to the filter is less than the path length from the information particle source to the detection arrangement.

Conveniently, placing the filter in the on-path position is used to communicate a first binary state, and placing the filter in the off-path position is used to communicate a second binary state.

Advantageously, the method further comprises the steps of: providing a pair of path length modules, each of the path length modules having an input and an output and defining a path length therebetween, the path lengths of the path length modules being substantially identical to one another and hidden from an observer of the path length modules; and arranging the path length modules so that particles travelling from the information particle source to the filter pass through one of the modules and particles travelling from the information particle source to the detection arrangement pass through the other of the modules.

Preferably, the method further comprises the step of providing a second filter and a second detection arrangement arranged so that the first filter is located near the second detection arrangement the second filter is located near the first detection arrangement.

Conveniently, the method further comprises the steps of: receiving, at the location of the first detection arrangement and the second filter, information from the location of the second detection arrangement and the first filter; and transmitting a confirmation signal to the location of the second detection arrangement and the first filter within a pre-set length of time after receiving the information.

Advantageously, the method further comprises the step of transmitting encrypted information.

Another aspect of the present invention provides a method for transmitting information comprising the steps of: providing a filter operable to act on a particle; providing an information particle source operable to emit particle pairs, the wavefunctions of the particles of the particle pair being entangled with one another, one particle in each pair being directed towards a detection arrangement and the other particle in each pair being directed towards the filter, the detection arrangement being operable to distinguish between one particle of a particle pair when the other particle of the particle pair has been acted on by the filter and one particle of a particle pair when the other particle of the particle pair has not been acted on by the filter; and moving the filter between an on-path position, in which the one particle in each particle pair passes though the filter, to transmit a first binary state to the detector, and an off-path position, in which the one particle in each particle pair does not pass though the filter, to transmit a second binary state to the detector.

In order that the present invention may be more readily understood embodiments thereof will now be described, by way of example, with reference to the accompanying drawings, in which:

FIG. 4 is an energy level diagram for an atomic system for use with the present invention;

FIG. 5 is a schematic view of an apparatus using the atomic system of FIG. 4;

FIG. 6 is a schematic view of a third information transmission arrangement embodying the present invention;

FIG. 9 shows a schematic view of the components of a delayed-choice interference experiment;

FIGS. 10a to 10c show diagrams assisting in the explanation of interaction-free measurement by repeated coherent interrogation.

The formalism of Quantum Mechanics when dealing with a many bodied system requires a basis to span the variables of the system. Thus if we have an n-body system we could have a set of base states $|x_1 \ldots x_n\rangle$ for position, physical properties are derived from the wavefunction $|\psi\rangle$ on this basis. The state of the system evolves by a first order linear differential equation:

$$i\hbar \frac{d}{dt}|\psi\rangle = H |\psi\rangle \qquad \text{Eqn. 1}$$

This shows a totally deterministic evolution of the wavefunction, however measurement is not deterministic and the measurement M and $\langle\psi^*|M|\psi\rangle$ collapses into one of the eigenstates of the operator M. The EPR[1] paper asked if the formalism of QM was even correct by concocting a scenario of a two bodied system described by a wavefunction $\psi(x_1, x_2)$ in which the two particles were separated by a space-like interval and a measurement performed. It seemed that if the system was solely described by the wavefunction, a measurement of one of the particles would cause a 'collapse of the wavefunction' thus seeming to determine the physical property of the other distant particle instantaneously.

Einstein objected, wanting particles to have ascribed classical, objective properties and Special Relativity to be obeyed. Thus QM was seen as incomplete requiring hidden variables much as in a classical coin split down the middle and concealed in two black-boxes: one distant observer revealing 'heads' would know that the other distant observer had 'tails' the system already had a state that the measurement simply revealed. Other measurement paradoxes such as 'Schrödinger's Cat' highlighted deep philosophical problems too.

The way out of this quandary according to Bohr[2] and the principle of Complementarity (or Copenhagen Interpretation) was that one should not speak of unmeasured quantities as though they exist classically; we can only measure complementary pairs of observables that commute, thus $P_X$ and Y or $P_Y$ and X but not $P_X$ and X or $P_Y$ or Y. Aspects of measurement seem to complement each other and indeed place the system in the state permitted by the measurement. A glib rephrasing of this in a staunchly logical positivist frame is that nothing exists unless it is measured. Thus the EPR argument is misguided, in this viewpoint the measured values did not exist prior to measurement and there is no conspiracy to send information superluminally when the act of measurement and the whole apparatus of measurement is taken into account.

Figure 1:
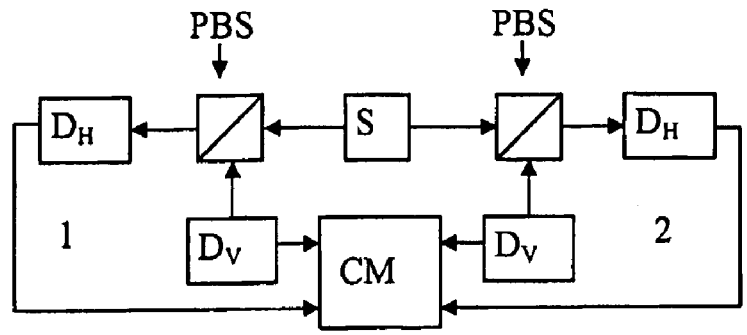
FIG. 1 is a schematic view of a set-up wherein photons are incident on polarising beam-splitters.

Meanwhile QM continued to have great successes and few were troubled by the apparent underlying philosophical non-objectivity. However some regarded Bohr's position as that of an obscurant and started to wonder if hidden variables existed and if this apparent superluminal communication was a real phenomena in rejection of the EPR view that it wasn't and could not be. Notably Bohm[3] (and de Broglie earlier) wondered if a 'quantum potential' or 'pilot wave' carrying only information could account for QM and place it back in a classical footing with addition of this device. Proofs were found that still required this hidden information to be sent superluminally and it was natural to wonder if it was real, something that could be tested experimentally. Bell[4,5] came up with a simplified EPR arrangement to test the predications of quantum over classical realism, the former causing correlations in the measurements over space-like intervals greater than the classical case. FIG. 1 shows the essence of the setup where an entangled source of photons, S is incident on polarizing beam-splitters (PBS) and then detectors picking up the horizontal and vertical photons.

$$|\Phi_s\rangle_{ij} = \frac{1}{\sqrt{2}}(|H\rangle_i|V\rangle_j + |H\rangle_j|V\rangle_i) \qquad \text{Eqn. 2}$$

A coincidence monitor, CM can compute the expectation value of the signals at the detectors $D_H$ and $D_V$:

$$E(1,2)=P_{HH}(1,2)+P_{VV}(1,2)-P_{HV}(1,2)-P_{VH}(1,2)$$

The Bell inequality is computed, where the primes donate the PBSs at different angles:

$$|E(1,2)+E(1',2')+E(1',2)-E(1,2')|=2 \qquad \text{Eqn. 3}$$

Noting the following probabilities:

$$P_{HH}(1,2)=P_{VV}(1,2)=\tfrac{1}{2}\cos^2(\theta_1-\theta_2) \text{ and}$$
$$P_{HV}(1,2)=P_{VH}(1,2)=\tfrac{1}{2}\sin^2(\theta_1-\theta_2)$$

Where $\theta_1$ is the angle of PBS1 and $\theta_2$ is the angle of PBS2
The expectation computes as: $E(1,2)=\cos 2(\theta_1-\theta_2)$
For the so-called 'Bell Angles' of $\theta_1=3\pi/8$, $\theta_1'=3\pi/8$ and $\theta_2=\pi/4$, $\theta_2'=0$ the Bell inequality is violated yielding:

$$|E(1,2)+E(1',2')+E(1',2)-E(1,2')|=2\sqrt{2}$$

Alain Aspect[6] et al performed this and beyond most people's reasonable doubt it is known that a posteriori correlations could be discerned to have occurred between photon pair states on measurements. Newer experiments[7] over distances of up to 10 km seem to make the space-like separation blunt.

It is currently thought that signalling via this mechanism would be impossible from the indeterminacy of quantum measurement—modulation by a polarizer would result in our binary digit and its complement being signalled half of the time intended.

The Apparatus

Naively we cannot have the distant signaler collapse the wavefunction of an entangled photon into horizontal or vertical components and then have the distant receiver measure the complement to set up a scheme of binary communication. The act of measurement is indeterminate so if the signaler wants to collapse to a horizontal state, he will only achieve this half of the time—the signal becomes totally obfuscated in noise. Relativists still skeptical of the Bell Channel are delighted by this limit as it protects their sacrosanct mindset on causality and the scheme of things.

Figure 2:
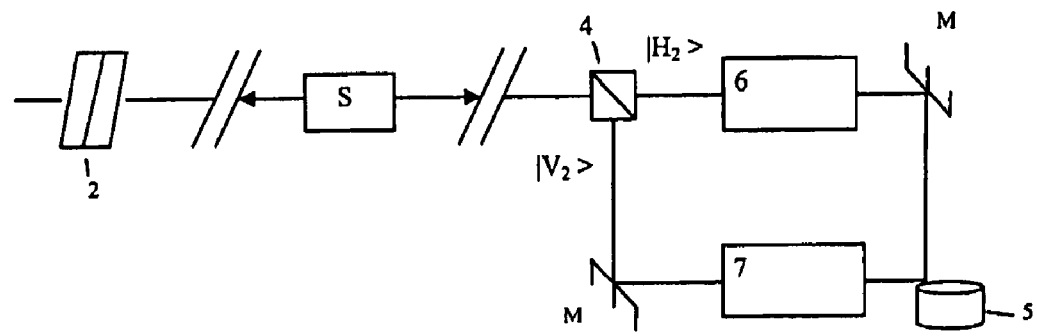
FIG. 2 is a schematic view of a first information transmission arrangement embodying the present invention.

The indeterminacy of measurement can be overcome if we can use the non-collapsed state as a binary digit and either of the collapsed states as the other. FIG. 2 shows a source (S) of entangled photons (pairs 1 and 2) as the communication channel. Distance between the polarising modulator and the interferometer is indicated by the double break in the lines showing the photon propagation. A non-destructive measurement[8,9] of the photon state by an interferometer set up (via polarising beam splitter, PBS) will distinguish the collapsed and non-collapsed states.

Since the horizontal component will not interfere with the vertical component from source both horizontal and vertical arms are rotated about the z-axis by a Faraday rotator or similar to bring them into diagonal alignment. To signal a binary 0 an entangled photon is sent via the communication channel. This achieved by making the distant polarising filter transparent. At the interferometer the incident photons are set with a destructive interference length to give minimal signal. Binary 1 occurs when the filter is either horizontal or vertical such that un-entanglement is transmitted and maximum signal occurs at the detector because there is no destructive interference. Note that the interferometer is at a greater distance from the source than the modulator.

In reality a several factors will make the probabilities deviate from the ideal: emission of un-entangled photons from the sources, imperfect optics and imperfect path lengths though it is an easy matter to amplify the difference between these two signals to achieve discrimination of the binary states. Note that at the instant of transmission photons are already present at the modulator and the detector—the signal is not transmitted by mass-energy only the quantum state is being transmitted. Also the state is not being copied so the "no cloning theorem" does not apply[11].

In general the probabilities calculated will only be very slight modulations in the output signal of the detectors for several reasons: most of the photons will not be entangled (only $1:10^{10}$ from a typical down conversion process) and the optics and path lengths will be less than ideal. So the signal will 'ride on top' a large bias signal carrying no information but AC coupling from the detector to an amplifier can begin to discriminate this. Several tens of photons are sent per bit to allow for path differences between the two arms of the interferometer and accurate interference.

Another embodiment is described below with reference to FIG. 3.

Since the horizontal component will not interfere with the vertical component from source (S) we regenerate the horizontal photon by entanglement with another source[9] 12 via PBS 2. For convenience source 12 has the same power as source (S). On taking the tensor product of $|H_2\rangle$ (delayed) and source 12, an entangled vertical photon is generated which therefore contains information sympathetic to channel/source (S). Phase information is shown on the state vector so that interference can occur at the detector. Note the un-used horizontal photons extant from the second PBS must be allowed to travel on in space untroubled least entanglement is lost before detection.

To signal a binary 0 an entangled photon is sent via the communication channel A. This achieved by making the distant polarising filter transparent. At the interferometer aspects of the incident photons (sources A and B) conspire to give minimal signal. Binary 1 occurs when the filter is either horizontal or vertical such that un-entanglement is transmitted.

On detection the following (ideal) probabilities and hence signal strengths at the detector is noted:

$$P_0 = P(\text{Horizontal} + \text{Vertical})$$
$$= P\left(\frac{1}{\sqrt{2}}|V\rangle_2 + \frac{e^{i\delta_A}e^{i\delta_B}}{\sqrt{2}}|V\rangle_3\right)$$
$$= \left|\frac{1 + e^{i\delta_A}e^{i\delta_B}}{\sqrt{2}}\right|^2 \to 0 \text{ if } \delta_A + \delta_B = \pi$$

$$P_1 = P(\text{Horizontal}) + P(\text{Vertical})$$
$$= P_1$$
$$= \frac{1}{2}P\left(\frac{1}{\sqrt{2}}|V\rangle_2 + \frac{e^{i\delta_A}e^{i\delta_B}}{\sqrt{2}}|V\rangle_3\right) +$$
$$\frac{1}{2}P\left(\frac{1}{\sqrt{2}}|V\rangle_2 + \frac{e^{i\delta_B}}{\sqrt{2}}|V\rangle_3\right) +$$
$$= \frac{1}{2}\cdot\left|\frac{1 + e^{i\delta_A}e^{i\delta_B}}{\sqrt{2}}\right|^2 + \frac{1}{2}\cdot\left|\frac{1 + e^{i\delta_B}}{\sqrt{2}}\right|^2 \to \frac{1}{2} \text{ if } \delta_B = 0$$

In general $P_0 \neq P_1$ by adjustment of the phase $\delta$. A Faraday rotator can be used on the horizontal output from PBS2, as another option, to allow it to interfere with the second arm through the interferometer. In reality a several factors will make the probabilities deviate from the ideal: emission of un-entangled photons from the sources, imperfect optics and imperfect path lengths though it is an easy matter to amplify the difference between these two signals to achieve discrimination of the binary states. Note that at the instant of transmission photons are already present at the modulator and the detector—the signal is not transmitted by mass-energy only the quantum state is being transmitted. Note too that the state is not being copied so the "no cloning theorem" does not apply[10].

A further method of sending classical data down a quantum channel as elaborated herein is to use Bell Inequalities relating to position and time as developed by Franson[14]. This method can favour communication over fibre-optic cable for long distances[7]. The essence is to generate entangled photons by a three level atomic system ($\psi_1, \psi_2, \psi_{Gnd}$):

Depicted in FIG. 4 is the energy level diagram for the atomic system. When the system is energised from the ground state into state $\psi_1$ which has a lifetime of $\tau_1$ a photon $\gamma_1$ is produced. The system then is in state $\psi_2$ which has a lifetime of $\tau_2$ which is considerably shorter than state $\psi_1$. On measurement of these photons we find that coincidence detection will monitor two events separated by $\tau_2$ seconds. The probability to detect a single particle is given by ($\eta$ detector efficiency):

$$P = \eta \langle 0|\psi^*(r;t)\psi(r,t)|0\rangle$$

Where the photon propagation operator creates a particle from the vacuum state $|0\rangle$ and is given in the Heisenberg representation (constant states with evolving operators) as:

$$\psi(r,t) = e^{iHt/\hbar}\psi(r)e^{-iHt/\hbar}$$

Consider the apparatus, shown in FIG. 5, due to Franson[14]: The source emits the photons $\gamma_1$ and $\gamma_2$ which are then collimated by lenses $L_1$ and $L_2$ and then filtered ($F_1$ and $F_2$) so that only photons $\gamma_1$ and $\gamma_2$ get through respectively. Half silvered mirrors $M_1$ and $M_2$ allow the photons to travel along longer interference paths $L_1$ and $L_2$ respectively as well as shorter paths $S_1$ and $S_2$ to detectors $D_1$, $D_2$ and $D'_1$ and $D'_2$.

Consider first the signal at the detectors $D_1$ and $D_2$ coincidence detection of the two photons is then represented by:

$$R_{12} = \eta_1 \eta_2 \langle 0 | \psi_0^*(r_1,t) \psi_0^*(r_2, t \pm \Delta T) \psi_0(r_1,t) \psi_0(r_2, t \pm \Delta T) | 0 \rangle$$

If the time offset window $\Delta T$ is considerably greater than $\tau_2$ then this figure tends to zero as is to be expected. On insertion of the silvered mirrors to include longer paths $L_1$ and $L_2$ and phase shifts $\phi_1$ and $\phi_2$, the wavefunction at the detectors is (for particle one):

$$\psi(r_1, t) = \frac{1}{2}\psi_0(r_1, t) + \frac{1}{2}e^{i\phi_1}\psi_0(r_1, t - \Delta T)$$

Franson is then able to derive the coincidence count between detectors $D_1$ and $D_2$ in this scenario with the interference paths as:

$$R_C = \frac{1}{4} R_{12} \cos^2(\phi^1 - \phi^2)$$

This is a Bell inequality once again showing non-local effects: the phases $\phi_1$ and $\phi_2$ set at space-like intervals are instantaneously controlling the coincidence count. Intuitively this can be understood in the following manner: when the photons $\gamma_1$ and $\gamma_2$ are produced they are entangled and share an uncertainty in time and space for the detection (and hence interference lengths in an interferometer) of $(\tau_1 + \tau_2)$ for both photons as this is the lifetime of the states $\psi_1$ and $\psi_2$. Detection (measurement) of the first photon $\gamma_1$ will guarantee detection of the second photon $\gamma_2$ in the much shorter time frame of $\tau_2$. Setting up a self interference path such as $L_2$ will measure this change in the coherence length of the wavefunction.

To implement the scheme of sending classical binary digits down a quantum channel as set out herein using this particular method of space and time correlation of wavepackets the apparatus shown in FIG. 6 is noted:

The protocol once again is that a binary zero is represented by the act of no modulation (M) and binary one by collapse of the joint wavefunction between $\gamma_1$ and $\gamma_2$. The modulator is an absorber and can be an electronic shutter made from a Kerr or Pockels cell arrangement. The bit time is longer than the transit time through the interferometer. The lifetime of the second state, $\psi_2$ is longer than the transit time through the interferometer.

Once again setting the source equidistant between interferometer and modulator, no information exists prior to the modulator preventing man-in-the-middle attacks. The collapse of the wavefunction and change in the interference length by the measurement of the modulator is reflected in the interferometer acting on the second particle. Interference is set up such that zero modulation results in minimal signal at the detector (destructive interference) and modulation results in maximum signal (constructive interference).

A Physically Secure Quantum Channel

Using two interferometers and modulators depicted in FIG. 2 a full duplex quantum channel can be set up. This channel is secure against "man in the middle attacks" because the information only exists at the extremities of the channel: any non-coherent measurement would collapse the wavefunction leaving only random noise; coherent measurement without the correct phase length would yield a constant binary digit as only entangled photons would be perceived. If the phase length could be guessed because the distance between the transmitting stations was well known, tapping into the channel would lead to massive obvious disruption and signal transmission loss; monitoring would catch this breach of security.

Nether-the-less further measures can be made by introducing a secret random phase length at both ends of the channel. The length of fibre optic cable, for instance, would be machine produced in matched pairs in a black box opaque to enquiry (by x-ray, ultrasound, terahertz radiation etc.) such that even the installer of the channel would not know the phase length. A security seal system too would destroy the apparatus if it was not inserted into the correct machinery of the communication channel but say time domain reflection equipment to ascertain the secret phase length. A secure docking procedure would do this.

A further aspect of the protection by the random phase length device would be if the eavesdropper was to guess a longer length as information exists after the modulation distance but not before. A periodic acknowledge-protocol within the permitted time frame of the channel phase length and the random phase length would ascertain that the wrong length has been inserted. Sub-nanosecond resolution would have the resolution to down to centimeters in a total channel length that could be kilometers. Phase lock would be a far from easy task.

Figure 7:
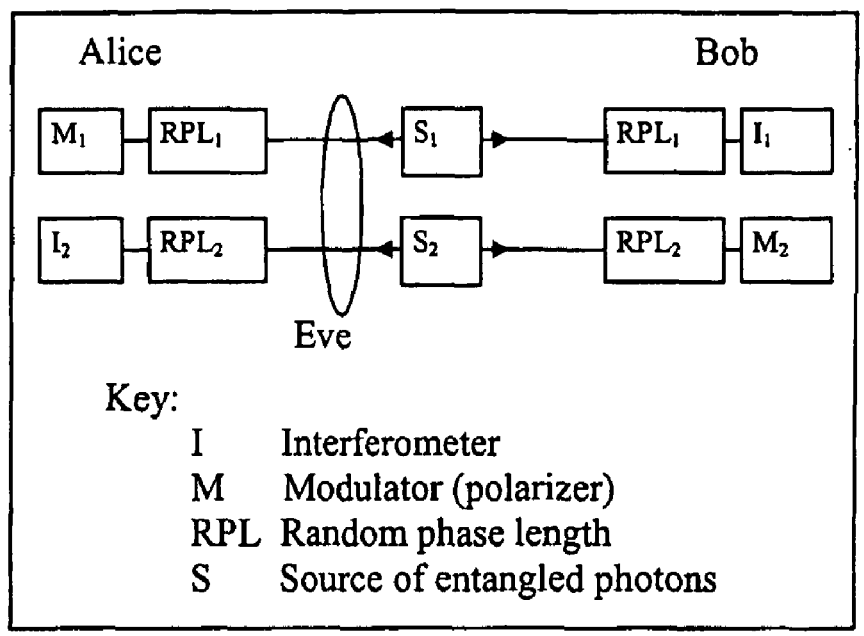
FIG. 7 is a schematic layout of a physically secure quantum channel.

Although the channel is quantum in nature, it is being used classically sending bits not qubits and all the conventional encryption measures for a classical digital channel would apply too. This physically secure and classically safe channel (in the sense of not cracking say, RSA codes should all the physical protection procedures be surmounted) is a boon to the transmission of sensitive information such as inter-bank money transfer or military information. FIG. 7 shows a schematic layout of a physically secure quantum channel as described above Discussion An apparatus and argument has been presented for the instantaneous transmission of information as an adjunct to Bell's Theory and the Aspect experiments. Naturally there are concerns about conflicts with Relativity but it shall be shown that nature always must be sending information superluminally to ensure conservation of probability and a rational, consistent view of the universe emerges. Experiments exist already that show the effect of a 'quantum potential[3]' that carries only pure information such as repeated coherent interrogation/non-invasive measurement where the wavefunction feels out the experiment environment without transfer of energy to the object under investigation. Inescapably our view of space-time must be altered in the following presentation.

Conservation of Probability Requires Superluminal Transfer of Quantum State Information The probability density of a normalised wavefunction in QM is given by the square of the wavefunction:

$$\rho(r,t) = |\psi(r,t)|^2$$

or $$\int \rho(r,t) d^3 r = 1$$

If there is any sense in the concept, probability is conserved and would obey the continuity equation:

$$\frac{\partial \rho(r,t)}{\partial t} + \nabla \cdot j(r,t) = 0$$

Where the probability current density j is derived on application of the Schrödinger equation to the above relations as:

$$\frac{\hbar}{2mi}(\psi^*\nabla\psi - \psi\nabla\psi^*)$$

Figure 8:
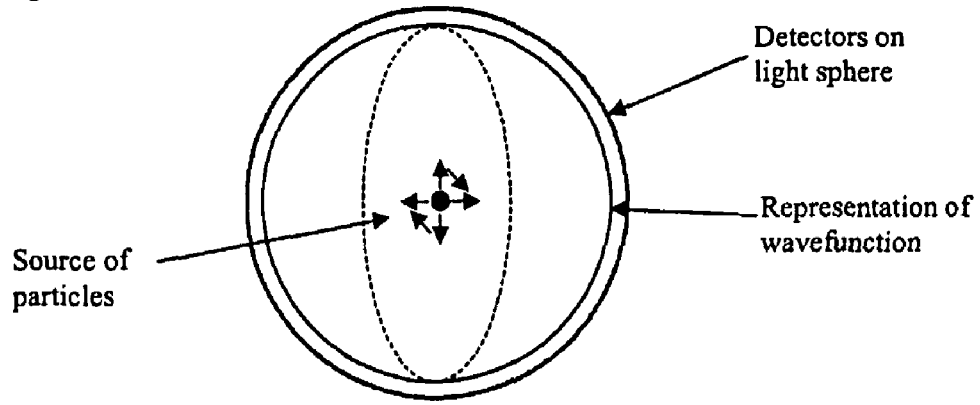
FIG. 8 is a schematic diagram of a source of spherically-distributed particles.

Take a spherical source of particles (FIG. 8) emitted slowly enough to be counted one at a time. Arranged on a sphere one light-year in diameter (say) is a surface of detectors. Only one particle will be counted per detection event as the light-year diameter wavefunction collapses (becomes localised) randomly so that probability is conserved. The wavefunction, in current thought, is not perceived as something that is 'real' but is then discarded and a classical path is ascribed from the source to the detector that registered the event to say the particle, retrospectively went along that path.

There is however a problem of discarding the literality of the wavefunction and trying to apply classical concepts before measurement as exemplified by the delayed choice interference experiment (FIG. 9). Photons enter the apparatus incident on a half silvered mirror A. Two detectors 1 and 2 can elucidate what path the photon took as it came into the apparatus. A second half silvered mirror B inserted into the apparatus can cause the paths to interfere. If the interference length is set so that registry of a photon must mean that both arms of the interferometer were traversed, then this leads to a problem in the classical mode of though if once again we can expand the apparatus to gigantean proportions. Classically the photon (or particle) went along either arm but not both; the decision was made at mirror A. If the arms of our apparatus are light-years across, then inserting mirror B after the photon has entered the apparatus seems to be determining what path the photon went along or whether it decided to act as a wave and use both arms after it entered this apparatus.

Current thought, not really taking the truth of the wavefunction's physical existence gets into knots trying to explain these phenomena. We have seen the obfuscation of the Bohr/Copenhagen view where the photon doesn't really exist until it is measured—though something must have been travelling through space. The Many Worlds explanation needs a separate universe at each detection event scenario so that the Schrödinger equation is always obeyed at measurement. Another idea (working with one universe) is that the detector that registered the event sent information back to the first mirror to determine what path to take; this is the advanced and retarded wave formulation. The trouble here is with the delayed choice experiment—information went back in time in this viewpoint.

It is reasonable to apply Occam's Razor to interpretations of this quantum measurement process and admit in all simplicity, that nature is 'feeling' out the measurement environment across the whole of the wavefunction and is sending information superluminally. Thus in FIG. 7 the wavefunction interacts with the surface of detectors on the light sphere and conspires so that only one particle per event is recorded thus probability is conserved. Similarly in FIG. 9 the wavefunction traversed the apparatus and was incident on mirror B and the detectors to insure a consistent result.

We suggest that nature has a scheme of keeping its state variables in check by superluminal transmission so concepts such as 'conservation of probability' aren't violated. The next section looks at interaction free measurement where an object can be imaged without, in the limit, photons being incident on it because it is interrogated by the wavefunction.

Interaction Free Measurement by Repeated Coherent Interrogation

The picture that is being formed in this paper is the primacy of the wavefunction as a real object in physics and what the effect of its ability to communicate superluminally does to the current state of understanding of space-time in physics. The real world physical effects of the wavefunction cannot be questioned because of the field of quantum non-invasive measurement[8,9]. The essence of this is shown in the diagrams below:

FIG. 10a shows an interferometer set up where a coherent photon source enters at the first beam splitter (partially silvered mirror) and recombines at a second. The detector D-Dark has its coherence length set so that the beams interfere destructively whilst the detector D-Light is set for constructive interference. In FIG. 10b an opaque object is placed in one arm of the interferometer. The firing of D-Dark indicates that a photon traversed the apparatus without interfering—that is it came down one arm only. Half of the time a photon will be absorbed by the object and the other half it will pass through to the detectors. We can say that the object has been detected with only half the incident number of photons into the measuring apparatus. Although beyond the scope of this paper FIG. 10c shows[8] the set up where by repeated coherent interrogations this 50% limit can be bettered and in the limit lead to no photons being absorbed by the object.

The 'trick' here is that although the beam splitter, rotator and mirrors give a very low probability for the photon to enter the side arm with the object ($\delta$ is very small, $\sin^2 \delta > 0$ in side arm, whilst main arm is $\cos^2\delta > 1$), the wavefunction always gets through, it is not attenuated (no potential barrier), we have $\psi = \sin \delta$ not say $\psi = A \sin \delta$ where A would be some attenuation factor. The wavefunction always measures the environment and can be made to traverse the apparatus many times not the photon, giving a vanishing probability of photon interaction with the object but growing certainty of its presence. The lowest mirror switches out the interrogating wavefunction after a number of transits. A detector at a set interference length can work out if the side arm is blocked by the count of the detected photons.

Simultaneity in Space, Simultaneity in Time

The Lorentz Transform can be understood to have terms amounting to the transit time of light signals:

Vt'γ and Vx'γ/c². The whole Lorentz group is then viewed as a rotation in the space-time of hyperbolic geometry. Absolute time and space concepts are gone; this is our view of 'reality'. What we say is that the physics is correct for light-speed signals (no change there!) but a better system of time measurement can be constructed with clocks using the Bell Channel. We suggest the transformation, x=x'γ and t=t'γ which can't be used to do physics (things respond to retarded potentials for instance) but is philosophically correct.

Figure 11:
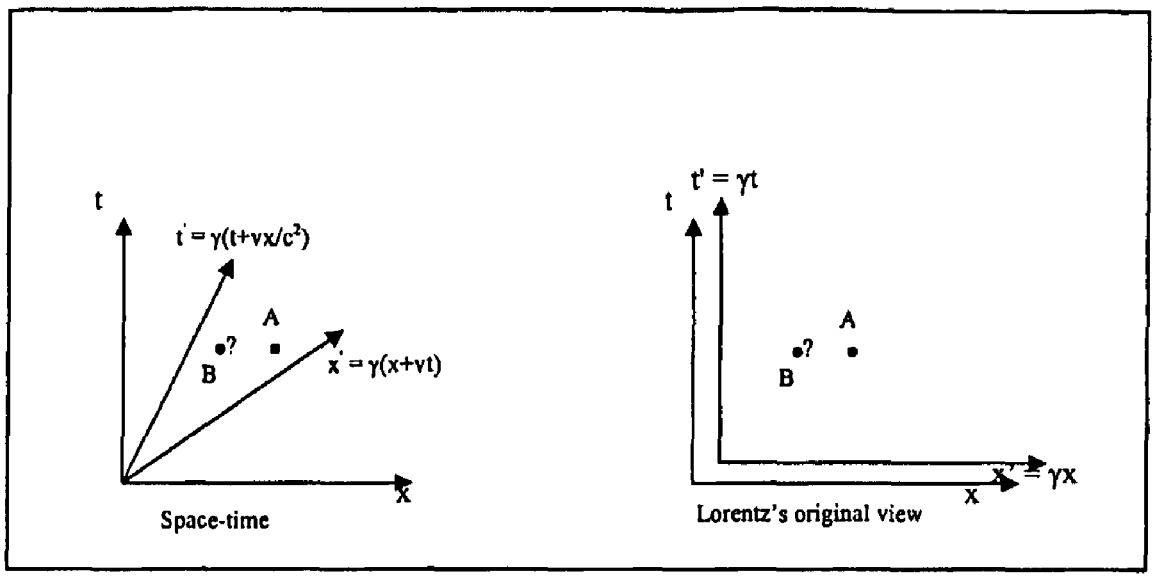
FIG. 11 shows two space-time diagrams of nearly simultaneous events using two different approaches.

FIG. 11 shows two space-time diagram views of events very nearly simultaneous in time by a superluminal signal over a space-like interval with event A proceeding B. The Lorentz view gets causality wrong, whilst the 'expand and contract' view of the axis gets it right. Thus the quotidian (3 space+1 time) view of objective reality is restored to space; events happen at a definite place and time agreeable by all observers—the Universe is a definite, objective stage in which the theatre of events occur. There is no need for an unknowable preferred reference frame in which simultaneity is preserved as Bell suggested—all observers can agree with this scheme and this was originally suggested by Lorentz in 1904 before reason was lost.

Quantum Reality 1: Schrödinger's Equation in 3-Space

Superluminal effects and the physical existence of the wavefunction force us to change our view about space-time. What emerges is the primacy of movement in 3-space below the speed of light of the wavefunction with length and time dilation effects. The wavefunction carries information about a quantum particle through space to interact with other quantum systems such as the measuring device. We say something is a particle when it has been measured and regular concepts such as energy and momentum are ascribed to it. This classical intellectual baggage has us thinking in terms of particles moving through space when we really should be thinking in terms of the wavefunction as the primary concept. Operations on it such as $\psi^* E \psi$ define physical observables of the system from the information and hence the physics.

Indeed to bridge the gap between the classical and quantum worlds, textbooks ease our mind by showing us that in the classical limit where the action is large we get the geometric limit of particular paths and classical mechanics, thus the ray equation or the Hamilton-Jacobi Equations:

Solving the Schrödinger Equation for a single particle in three dimensions we obtain an approximation:

$$\psi = F e^{\frac{i}{\hbar} A} \quad \text{Eqn. 4}$$

Where the phase A is a real function of co-ordinates that will be identified with the classical action and F is a real or complex function independent of time. Due to the smallness of h very rapid changes in phase result in this function over small distances; thus the wavefunction far away from the path of least action rapidly interferes and decays giving the notion of a classical path in the limit. Substitution of equation 4 in the Schrödinger Equation yields:

$$\left[\frac{1}{2m}(\nabla^2 A) + V + \frac{\partial A}{\partial t}\right] F - \quad \text{Eqn. 5}$$
$$\frac{i\hbar}{2m}\left[F \nabla^2 A + 2\left(\frac{\partial A}{\partial x}\frac{\partial F}{\partial x} + \frac{\partial A}{\partial y}\frac{\partial F}{\partial y} + \frac{\partial A}{\partial z}\frac{\partial F}{\partial z}\right)\right] - \frac{\hbar}{2m}\nabla^2 F = 0$$

By decreeing classical mechanics and letting $h \to 0$ which is equivalent to the wavelength going to zero, the $1^{st}$ and $2^{nd}$ order terms dropout yielding:

$$\frac{1}{2m}(\nabla^2 A) + V + \frac{\partial A}{\partial t} = 0 \quad \text{Eqn. 6}$$

Which on the assumption that the wave is monochromatic and that:

$$A(x, y, z, t) = S(x, y, z) - h\nu t$$
$$= S - Et$$

On substitution in equation 6 we obtain a form of the Hamilton-Jacobi Equation:

$$|\text{grad } S| = \sqrt{2m(E-V)}$$

Somehow the quantum effects are wished out of view and we are further featherbedded by the idea of a particle in space being represented as a wave packet whose composition is given by the spectral Fourier coefficients. This applies when the particle has been measured and its position and momentum fall in a narrow range governed by the Uncertainty Principle such that a wave packet results. The situation in FIG. 7 invalidates this wave packet view point because the wavefunction is given by a spherical wave, $e^{ik \cdot r}/r$ before measurement. It is only after detection that we ascribe position and momentum to a particle concept.

Really it is the wavefunction that travels through space, furthermore in FIG. 4 the wavefunction conspires with all the detectors such that conservation of probability is always true: if one photon is measured at one place at one time, it can be measured nowhere else. It is easier to apply Occam's razor to all the formulations of this measurement problem such as the Many Worlds, Advanced-Retarded Waves (the precognisance of the measurement—even information travelling backwards in time from the future!) and admit in all simplicity that all the detectors have been superluminally connected by the wavefunction with passage of information such that only one photon per instant is measured.

It is convenient for the mind to show quantum mechanics as approximating classical mechanics. Via classical mechanics we derive our concepts of space and time, though we should stop trying to do this and face the quantum reality of the wavefunction moving through 3-space. Things exist at macroscopic level that can never be explained classically such as ferromagnetism, superconductivity, the shapes of molecules and the shapes of crystals and we should admit the same for space and time.

Quantum Reality 2: The Measurement Problem and Decoherence

Quantum Mechanics is a description of nature and equation 1 should always be true. However measurement throws the system into an eigenstate of the measurement operator and assigns a probability to it thus:

$$\text{state} = \frac{M_M |\psi\rangle}{\sqrt{\langle\psi| M_M^* M_M |\psi\rangle}}$$
$$p(M) = \langle\psi| M_M^* M_M |\psi\rangle$$

This is the measurement problem: a non-unitary change from the Schrödinger equation to the above. Schrödinger highlighted this in his famous cat paradox where he showed a microscopic quantum event getting entangled with the macroscopic measurement equipment to magnify this obviously nonclassical behaviour to absurd proportions. The result was that the cat was left in a superposition of the dead and alive states to be collapsed by when and by whom?

Some of the philosophical spin offs from this were Bohr's Complementarity/Copenhagen Interpretation, weird mind-body/consciousness effects collapsing the wavefunction, the Many World's Interpretation or advanced/retarded waves and quantum super-determinism in which events in the pre-ordained future affect the present. Applying Occam's Razor to this once again and noting what people are actually seeing in their attempts to construct quantum computers[11] and the difficulty of maintaining pure states, the most likely, sane candidate to explain the measurement problem is Decoherence Theory[12,13].

The central tenant of Decoherence Theory is the entanglement of a pure state with the environment and the calculation of the reduced density matrix $$|\psi\rangle = \alpha_0 |0\rangle + \alpha_1 |1\rangle$$

for the system from the system-environment density matrix. Starting with a simple case, consider a closed two-state system described by the following state in two-dimensional Hilbert space:

The states $|0\rangle$ and $|1\rangle$ are orthogonal. The most general way for calculating physical quantities in QM is by use of the density matrix/operator, thus:

$$\hat{\rho} = |\psi\rangle\langle\psi|$$

giving $$\hat{\rho} = |\alpha_0|^2|0\rangle\langle0| + \alpha_0\alpha_1^*|0\rangle\langle1| + \alpha_0\alpha_1^*|1\rangle\langle0| + |\alpha_1|^2|1\rangle\langle1|$$

and the density matrix $$[\rho_{mn}] = [\langle m|\rho|n\rangle] = \begin{bmatrix} |\alpha_0|^2 & \alpha_0\alpha_1^* \\ \alpha_0^*\alpha_1 & |\alpha_1|^2 \end{bmatrix} \quad \text{Eqn. 7}$$

The diagonal components give the probability that the system is in either state, the off diagonal components the interference between the states. The expectation of any observable represented by an operator A is given by the trace over the product of the density and operator matrices:

$$\langle\psi|A|\psi\rangle = Tr(\rho A) = \sum_{mn} \rho_{mn} A_{mn}$$

The system cannot exist in isolation and through unitary evolution becomes entangled with the environment represented by states $|e_0\rangle$ and $|e_1\rangle$ which are in general non-orthogonal. On taking the tensor product, the density matrix becomes:

$$\hat{\rho}(t) = |\alpha_0|^2|0\rangle\otimes|e_0\rangle\langle0|\otimes\langle e_0|+\alpha_0\alpha_1^*|0\rangle\otimes|e_0\rangle\langle1|\otimes\langle e_1|+\alpha_0^*\alpha_1|1\rangle\otimes|e_1\rangle\langle0|\otimes\langle e_0|+|\alpha_1|^2|1\rangle\otimes|e_1\rangle\langle1|\otimes\langle e_1|$$

In principle we cannot know the state of the environment and so we are left taking the reduced density matrix with the environmental states traced out. Orthogonal environment basis vectors $|e_0\rangle$ and $|e_0^\perp\rangle$ are used thus:

$$\langle e_0^\perp|e_0\rangle=0, \langle e_0|e_1\rangle=\cos\theta, \langle e_0^\perp|e_1\rangle=\sin\theta$$

The reduced density matrix of the two-state system is given by:

$$\hat{\rho}_s(t)=Tr_E\rho(t)=\langle e_0|\rho(t)|e_0\rangle+\langle e_0^\perp|\rho(t)|e_0^\perp\rangle$$

hence $$\hat{\rho}(t)=|\alpha_0|^2|0\rangle\langle0|+\alpha_0\alpha_1^*\cos\theta|0\rangle\langle1|+\alpha_0^*\alpha_1\cos\theta|1\rangle\langle0|+|\alpha_1|^2|1\rangle\langle1| \quad \text{Eqn. 8}$$

Comparing this with eqn. 7 we see the modification to the coherence terms. The environmental states $e_0$ and $e_1$ are themselves evolving with time and since the environment is truly vast with many energy states, $e_0$ and $e_1$ will find themselves orthogonal in a very short period of time[12], for instance if each state is a function of many variables such as ($k_1 \ldots k_N$, $r_1 \ldots r_N$) a change in at least one would lead to a very different wavefunction. Consider this simple example for part of the environment modelled by two particles in a rectangular box of infinite potential, the wavefunction for one particle is:

$$\psi_{n_1 n_2 n_3} = \sqrt{\frac{8}{abc}} \sin\frac{\pi n_1}{a} x \cdot \sin\frac{\pi n_2}{b} y \cdot \sin\frac{\pi n_3}{c} z$$

The dimensions of the box are a, b, c and taking the orthogonality condition for the two particles 1,2:

$$\int_V \psi_1 \psi_2 \, dx \, dy \, dz = \delta_{abc}$$

Soon the wavefunctions are orthogonal—lattice vibrations/thermal relaxation effects will make a, b, c vary continuously in time.

Thus after a short time our environmental states become orthogonal and our density matrix tends to:

$$\hat{\rho}(t)=|\alpha_0|^2|0\rangle\langle0|+|\alpha_1|^2|1\rangle\langle1|$$

That is, a statistical mixture of pure states with no superposition. The whole density matrix evolves in a unitary manner but it is the act of taking the reduced trace, to that which concerns our system that gives the illusion of wavefunction collapse and non-unitary change. By the time we open the box, Schrödinger's Cat is already dead or still alive. A large statistical sample of such experiments would give the results of the reduced density matrix. We can't say which cat will live or die but only predict statistics exactly analogously to the probability space of a multi-particle problem in classical statistical mechanics.

CONCLUSION

We have discussed a superluminal communication/encryption scheme. The 'Quantum Potential[3]' though pure information and having no mass-energy is real and engineering uses for it ought to be considered. It seems another trick has been squeezed out of nature similar to the amazement a century ago that greeted the Maxwell, Hertz, Marconi and Logie Baird discoveries of sending information, speech and pictures incredibly fast around the globe. Zeilinger et al[8,9] have talked about non-invasive measurements where X-rays could be used to image a source without actually (in the limit) imparting energy to the object—a boon to medical imaging perhaps. Understanding encryption, preserving it and working with it are crucial too for the burgeoning field of Quantum Computation[11].

At a fundamental level the process of entanglement of a quantum state with the environment seems to be giving some measure of understanding to this mysterious process and a semi-classical view of quantum mechanics becomes apparent with the wavefunction evolving deterministically by the Schrödinger Equation, always, as it should.

There is considerable irony here; Einstein disliked Quantum Mechanics for its apparent disregard for Objective Reality (indeterminacy and the measurement problem). Modern formulations of QM view the measurement problem as one of loss of coherency as a quantum system gets entangled with its environment[12]. This is a deterministic process as is the evolution of the isolated wavefunction anyway. Space-time with its denial of place and time really makes the universe a mystery, non-objective and non-classical—just how can we talk of the independent existence of an event if it is dependent on the measurement? The pot is calling the kettle black. Space-time is just a calculation/conceptualisation tool for effects involving mass-energy moving at or below the speed of light. Quantum Mechanics saves reason and returns the Universe to an objective stage of 3-space and time where simultaneous events and material things too can be said to have occurred or existed at a definite place and time independent of measurement. Classical 'sentiments' and intuition can return to physics in this way if we accept the primacy of a flow of the quantum state (and all that entails—the quantum rules) as a wave through 3-space and time (with relativistic effects of length contraction and time dilation) instead of a classical particle.

To return to the figures, FIG. 2 shows a signal communication apparatus 1. The apparatus comprises an information particle sources, which is operable to emit particle pairs having indeterminate but related directions of polarisation. In preferred embodiments while the direction of polarisation of neither particle is determined when a particle pair is emitted, the directions of polarisation of the particles are constrained to be different from one another by 90°. It will be appreciated that, for momentum to be conserved, the particles will be emitted in opposite directions. The information particle source is configured so that a first particle in the particle pair is emitted in a first direction, towards a polarising filter 2, and a second particle in the particle pair is emitted in a second direction, towards a detection arrangements, as will be described below in more detail.

In preferred embodiments of the invention, the particles emitted by the information particle source are photons.

The polarising filter 2 is a filter that allows photons having a particular direction of polarisation to pass. The polarising filter 2 is adapted to be placed in a first position, in which the first particle in each particle pair impinges on the filter, or in a second position, in which the first particle in each particle pair bypasses the polarising filter 2 and continues onwards. The polarising filter 2 may be moveable between the first and second positions in a short period of time.

The modulation of the polarising filter 2 can be achieved by several means. The path of the first particle can be switched between a transparent and polarized path with a switchable mirror. Alternatively electro-optic components such as Faraday rotators, Kerr and Pockel cells acting as electronic shutters can with the assistance of a polarizing beam splitter split the wavefunction of particle one into two channels, horizontal and vertical with dual synchronised shutters set at the appropriate angle for the horizontal or vertical channels. A shutter on its own works by rotating the plane of the wave and to implement the transparent case to transmit binary zero we must have clear transmission—this could not be done with a single shutter because of its polarizing action when open.

The detection arrangement 3 comprises a polarising beam splitter 4 which is the first component of the detection arrangement that is encountered by an incoming particle. The detection arrangement 3 also comprises a detector 5, which is operable to detect particles of the type emitted by the information particle sources, and to provide an appropriate signal when a particle of this type impinges on the detector 5. First and second paths are defined between the polarising beam splitter 4 and the detector 5, and a particle may travel along either of the paths to reach the detector 5. The polarising beam splitter is arranged so that incoming particles having a first direction of polarisation are directed along the first path, and incoming particles having a second direction of polarisation (which in the present example is preferably different from the first direction of polarisation by 90°) are directed along the second path.

In a preferred embodiment of the invention, suitably angled mirrors M are provided to guide particles travelling along the paths towards the detector. In addition, first and second Faraday rotators 6, 7 are located on each path so that a particle travelling along the first path has its direction of polarisation rotated by $\pi/4$ (i.e. 45°) and a particle travelling along the second path has its direction of polarisation rotated by $-\pi/4$ (i.e. −45°). Alternatively a single Faraday rotator may be located so that a particle travelling along the first path has its direction of polarisation rotated $\pi/2$ (i.e. through 90°).

A half-silvered mirror or another suitable device (not shown) is provided near the detectors to allow particles that have traveled along either of the paths to approach the detectors from the same direction.

The polarising filter 3 is placed slightly closer to the information particle source than the detector 5 is to the particle information sources. Therefore, by the time the second particle in each particle pair reaches the detector 5, the first particle of the pair has either impinged on the polarising filter 2, and so the direction of polarisation of the first particle in the pair (and, therefore, also the second particle in the pair) has been determined, or the first particle of the particle pair has bypassed the polarising filter 2 and the direction of polarisation of the first particle of the pair has not been determined, in which case the direction of polarisation of the second particle in the pair in also indeterminate. The progress of a particle through the detection arrangement 3 either case will now be considered.

In the case where the direction of polarisation of the particle arriving at the detection arrangement 3 has been determined, the particle will pass through the polarising beam splitter 4 and be directed along one of the arms of the detection arrangement 3, depending upon the actual direction of polarisation. Whichever of the paths the particle is directed along, the particle will arrive at, and be detected by, the detector 5 and the arrival of the particle will cause the detector 5 to produce an appropriate signal.

In the case where the direction of polarisation of the particle arriving at the detector has not been determined, it will be understood that the particle will be in a superposition of polarisation states. On impinging upon the polarising beam splitter 4, a portion of the wavefunction of the particle corresponding to the particle having the first direction of polarisation will be directed along the first path, and a further portion of the wavefunction corresponding to the particle having the second direction of polarisation will be directed along the second path.

As the portions of the wavefunction that propagate along the first and second paths pass through the first and second Faraday rotators 6, 7, the directions of polarisation of the particles corresponding to these portions of the wavefunction are rotated by $\pi/4$ and $-\pi/4$ respectively and will therefore be equal. The two portions of the wavefunction will both arrive at the detector 5 and will combine with, and superimpose upon, one another. The relative lengths of the two paths are set so that this superposition will result in destructive interference at the detector 5, and so no particle will be detected.

The detection arrangement 3 is therefore operable to distinguish between an incoming particle whose direction of polarisation has been determined (by the polarising filter 2 being in the first position when the other particle of the pair reached the polarising filter) and an incoming particle whose direction of polarisation has not been determined (if the polarising filter 2 has been bypassed by the other particle of the particle pair). In the first case, a particle will be detected by the detector 5, and in the second case no particle will be detected. to perform the function of modulator to implement a protocol for classical binary data transmission over a quantum channel, when the polarising filter 2 is rendered transparent, the first particle of each pair remains in the state of superposition of horizontal and vertical components—this signals binary zero. When the polarising filter 2 is put into the vertical or horizontal position a measurement will be performed on the wavefunction for the first particle that will render collapse into solely the horizontal or vertical component—this signals binary one. The modulation time should be sufficient for the second particle to traverse the interferometer apparatus and allow sufficient particles to trigger the detector and ensure a good signal to noise ratio.

The purpose of the Faraday rotators 6, 7 is to manipulate the portions of the wavefuncton corresponding to particles travelling along the first and second paths so that they may interfere with one another. A further example of a manipulation arrangement to fulfil this function will be described below.

Figure 3:
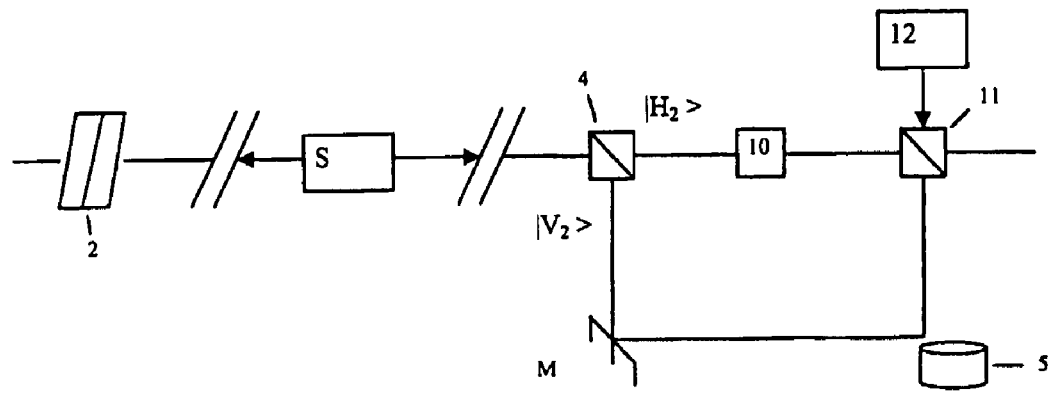
FIG. 3 is a schematic view of a second information transmission arrangement embodying the present invention.

FIG. 3 shows a second signal communication apparatus 8 embodying the present invention. Once again the apparatus comprises an information particle source, a polarising filter which is arranged at a distance from the information particle sources and a detection arrangement 9 which is also arranged at a distance from the information particle sources, so that particle pairs will impinge on the polarising filter 2 and detection arrangement 9 respectively. The detection arrangement 9 of the second signal communication apparatus 8 is, however, different from that provided as part of the first, and this will be described in more detail below.

Once again the detection arrangement 9 comprises a polarising beam splitter 4 which is arranged so that incoming particles having a first direction of polarisation are directed to the first path and incoming particles having a second direction of polarisation (different from the first direction of polarisation by 90°) are directed along the second path.

The second path simply comprises a suitably angled mirror M to deflect particles travelling along the second path towards the detector.

The first path includes a phase alteration component 10 through which particles travelling along the first path must pass, and the phase alteration component effectively adds a pre-set length to the effective path length of the first path. The phase alteration component 10 may, for example be a block of glass having a very carefully machined length.

A further polarising beam splitter 11 is also provided on the first path. In the present example, the detection arrangement 9 is configured so that particles having a horizontal direction of polarisation are directed along the first path (with particles having a vertical direction of polarisation being directed along the second path) and the further polarising beam splitter 11 is arranged so that particles impinging thereon having a horizontal direction of polarisation are allowed to pass through the further polarising beam splitter 11, and incident particles having a vertical direction of polarisation are reflected towards the detector 5.

A further particle source 12 is also provided, arranged to emit particles (of the same type as those emitted by the information particle source) towards the further polarising beam splitter 11.

In the case of an incident particle having an indeterminate direction of polarisation, the portion of the wavefunction of the particle from the information particle sources that travels along the first path is put into an additional superposition with the wavefunction of a particle emitted by the further particle source 12, which will have a component corresponding to a vertical direction of polarisation. This will allow interference at the detector 5 between the portions of the wavefunction of the incident particle that have traveled along the first and second paths. As before, the length of the two paths are chosen so that the two portions of the wavefunction will interfere destructively, resulting in no particle detection by the detector 5. This is achieved by the introduction of the phase alteration component 10 which is located on the first path.

It will therefore be understood that this detection arrangement 9 is also capable of distinguishing between an incoming particle whose direction of polarisation has been determined and an incoming particle whose direction of polarisation has not been determined.

As discussed above in relation to FIG. 4, two-way communication can be achieved by using two transmission arrangements in parallel with one another, but arranged for information to be transmitted in opposite directions.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

For Chris, Eugene and Farooq.

REFERENCES

1. A. Einstein, B. Podolsky, N. Rosen. *Can Quantum-Mechanical Description of Physical Reality Be Considered Complete?* Phys. Rev. 47, 777 (1935).
2. N. Bohr. *Can Quantum-Mechanical Description of Physical Reality be Considered Complete?* Phys Rev 48, 696 (1935).
3. D. Bohm. *Wholeness and the implicate order*. Routledge and Kegan London (1980).
4. J. S. Bell. *On the Einstein-Podolsky-Rosen Paradox*. Physics 1, 195-200 (1964).
5. J. S. Bell. *Foundations of Quantum Mechanics*. Ed. B. d'Espagnat, New York: Academic, 171 (1971).
6. A. Aspect, P. Grangier, G. Roger. *Experimental Realization of Einstein-Podolsky-Rosen-Bohm Gedankenexperiment: a New Violation of Bell's Inequalities*. Phys. Rev. Lett. 49, 91 (1982).
7. W. Tittel, J. Brendel, H. Zbinden and N. Gisin. *Violation of Bell Inequalities by Photons More Than 10 km Apart*. Phys. Rev. Lett. 17, 81, 3563-3566 (1998).
8. P. Kwiat, H. Weinfurter, A. Zeilinger. *Quantum Seeing in the Dark*. Scientific American November 1996.
9. M. Kasevich, P. Kwiat, H. Weinfurter, A Zeilinger. *Interaction-Free Measurement*. Phys. Rev. Lett 74, 24 (1995).
10. Z. Zhao, Y. Chen, H. Briegel et al. *Experimental demonstration of five photon entanglement and open-destination teleportation*. Nature 430, 54-58 (2004).
11. M. Nielsen, I. Chuang. Quantum Computation and Quantum Information. Cambridge (2000).
12. W. H. Zurek. *Decoherence and the Transition from Quantum to Classical*. Los Alamos Science Number 27 2002.
13. H. E. Brandt. *Quantum Computation: The Grand Mathematical Challenge for the Twenty First Century and the Millennium*. Proc. Am. Math. Soc. (17-18 Jan. 2000).
14. J. D. Franson. *Bell Inequality for Position and Time*. Phys. Rev. Lett. 62, 19 (1989).

The invention claimed is:

1. An information transmission arrangement comprising:
   an information particle source;
   a filter provided at a first location, the filter being configured only to allow particles having a certain value of a parameter to pass therethrough; and
   a detection system provided at a second location, the detection system comprising a splitter, a detector, and first and second paths defined between the splitter and the detector, the splitter being arranged to direct an incoming information particle along the first or second path depending upon the value of the parameter of the incoming particle; and
   a manipulation arrangement located on at least the first path, the manipulation arrangement comprising either a rotator arrangement provided on the first path and operable to alter the direction of polarisation of particles passing along the first path, or a phase alteration component that is arranged to alter the effective length of the first path, the manipulation arrangement being operable to manipulate the portions of the wavefunction corresponding to particles travelling along the first and second paths so that they interfere with each other at or before the detector,
   wherein the information particle source is configured to emit particles, so that a first particle in the particle pair is emitted in a first direction, towards the filter, and a second particle in the particle pair is emitted in a second direction, towards the detection system; and
   wherein the detection system is operable to distinguish between an incident particle having a determined value of the parameter and an incident particle having an undetermined value of the parameter, the undetermined value indicating that the wavefunction of the incident particle remains in a superposition of states.

2. An information transmission arrangement according to claim 1, wherein the manipulation arrangement is arranged so that if a particle in a superposition of values of the parameter impinges on the splitter and a wavefunction of the particle is directed along both the first and second paths, the manipulation arrangement will act on the wavefunction to allow interference, at or before the detector, between the portions of the wavefunction that were directed along the first and second paths.

3. An information transmission arrangement according to claim 2, wherein the parameter is the direction of polarisation of a particle, and the filter is a polarising filter.

4. An information transmission arrangement according to claim 1, wherein the information particle source is operable to emit particle pairs, one particle in each pair being directed towards the filter and the other particle in each pair being directed towards the detection system.

5. An information transmission arrangement according to claim 1 wherein the filter may be moved between an on-path position, in which the one particle in each particle pair passes though the filter, and an off-path position, in which the one particle in each particle pair does not pass though the filter.

6. An information transmission arrangement according to claim 1, wherein the particles emitted by the information particle source are matter particles.

7. An information transmission arrangement according to claim 1, wherein the information particle source is operable to emit pairs of particles whose wavefunctions are entangled with one another.

8. An information transmission arrangement according to claim 1, wherein the path length from the information particle source to the filter is less than the path length from the information particle source to the detection system.

9. An information transmission arrangement according to claim 1, wherein a pair of path length modules are provided, each of the path length modules having an input and an output and defining a path length therebetween, the path lengths of the path length modules being substantially identical to one another and hidden from an observer of the path length modules, one of the path length modules being placed so that particles travelling from the information particle source to the filter pass therethrough and the other of the path length modules being placed so that particles travelling from the information particle source to the detection arrangement pass therethrough.

10. An information transmission arrangement according to claim 1, wherein the particles emitted by the information particle source are photons.

11. An information transmission arrangement comprising first and second transmission arrangements according to claim 1 arranged as a duplex channel.

12. An information transmission arrangement comprising:
    an information particle source, operable to emit pairs of particles, a first particle in a pair being emitted towards a first location and a second particle in a pair being emitted towards a second location;
    a filter provided at the first location, the filter being moveable between an on-path position, in which the one particle in each particle pair is absorbed by the filter, and an off-path position, in which the one particle in each particle pair is not absorbed by the filter; and
    a detection arrangement provided at the second location, the detection arrangement being operable to distinguish between an incident particle having a relatively short coherence length and an incident particle having a relatively long coherence length.

13. An information transmission arrangement according to claim 12, wherein the information particle source comprises a sample of a material having at least a three-level atomic structure, one of the particles of a particle pair being emitted as an electron moves from a first level to a second level within the structure and the other one of the particles of the particle pair being emitted as the electron moves from the second level to a third level within the structure.

14. An information transmission arrangement according to claim 12, wherein the detection arrangement comprises:
    a splitter; and
    a detector, first and second paths being defined between the splitter and the detector, a path length of the first path being longer than a path length of the second path, the arrangement being such that, if a particle impinges on the splitter and a wavefunction of the particle is directed along both the first and second paths, the portions of the wavefunction that were directed along the first and second paths may interfere with one another at or near the detector.

15. An information transmission arrangement according to claim 12, wherein the incident particle having a relatively long coherence length corresponds to an incident particle having an uncollapsed wavefunction and the incident particle having a relatively short coherence length corresponds to an incident particle having a collapsed wavefunction.

16. An information transmission arrangement according to claim 12, wherein the information particle source is operable to emit pairs of particles whose wavefunctions are entangled with one another.

17. An information transmission arrangement according to claim 12, wherein the path length from the information particle source to the filter is less than the path length from the information particle source to the detection arrangement.

18. An information transmission arrangement according to claim 12, wherein a pair of path length modules are provided, each of the path length modules having an input and an output and defining a path length therebetween, the path lengths of the path length modules being substantially identical to one another and hidden from an observer of the path length modules, one of the path length modules being placed so that particles travelling from the information particle source to the filter pass therethrough and the other of the path length modules being placed so that particles travelling from the information particle source to the detection arrangement pass therethrough.

19. An information transmission arrangement according to claim 12, wherein the particles emitted by the information particle source are photons.

20. An information transmission arrangement comprising first and second transmission arrangements according to claim 12 arranged as a duplex channel.

21. An information transmission arrangement according to claim 12, wherein the detection arrangement comprises a first splitter, a second splitter, and first and second paths defined between the first splitter and the second splitter, a path length of the first path being longer than a path length of the second path.

22. An information transmission arrangement according to claim 21, wherein the first splitter creates the first path and the second path, and wherein the second splitter recombines the first path and the second path.

23. An information transmission arrangement according to claim 22, wherein the detection arrangement further comprises a detector positioned to receive output from the second splitter.

24. An information transmission arrangement according to claim 22, wherein the lengths of the first path and the second path are selected so that interference occurs at the second splitter for an incident particle having a relatively long coherence length but not for an incident particle having a relatively short coherence length.

25. A method for transmitting information comprising the acts of:
providing a filter operable to act on a particle;
providing an information particle source operable to emit particle pairs, the wavefunctions of the particles of the particle pair being entangled with one another, one particle in each pair being directed towards a detection arrangement and the other particle in each pair being directed towards the filter, the detection arrangement comprising a splitter, a detector, first and second paths defined between the splitter and the detector, and a manipulation arrangement located on at least the first path, the manipulation arrangement being operable to manipulate the portions of the wavefunction corresponding to particles travelling along the first and second paths so that they interfere with each other at or before the detector, the detection arrangement being operable to distinguish between one particle of a particle pair when the other particle of the particle pair has been acted on by the filter and one particle of a particle pair when the other particle of the particle pair has not been acted on by the filter; and
moving the filter between an on-path position, in which the one particle in each particle pair passes though the filter, to transmit a first binary state to the detector, and an off-path position, in which the one particle in each particle pair does not pass though the filter, to transmit a second binary state to the detector.

26. A method for transmitting information comprising the acts of:
providing, at a first location, a filter configured only to allow particles having a certain value of a parameter to pass therethrough;
providing, at a second location, a detection system comprising a splitter, a detector, and first and second paths defined between the splitter and the detector, the splitter being arranged to direct an incoming information particle along the first or second path depending upon the value of a parameter of the incoming particle, a manipulation arrangement being located on at least the first path, the manipulation arrangement comprising either a rotator arrangement provided on the first path and operable to alter the direction of polarisation of particles passing along the first path, or a phase alteration component that is arranged to alter the effective length of the first path, the manipulation arrangement being operable to manipulate the portions of the wavefunction corresponding to particles travelling along the first and second paths so that they interfere with each other at or before the detector, the detection system being operable to distinguish between an incident particle having a determined value of the parameter and an incident particle having an undetermined value of the parameter, the undetermined value indicating that the wavefunction of the incident particle remains in a superposition of states;
providing an information particle source operable to emit particle pairs, one particle in each pair being directed towards the filter and the other particle in each pair being directed towards the detection system; and
moving the filter between an on-path position, in which the one particle in each particle pair passes though the filter, and an off-path position, in which the one particle in each particle pair does not pass though the filter.

27. A method according to claim 26, wherein the path length from the information particle source to the filter is less than the path length from the information particle source to the detection arrangement.

28. A method according to claim 26, wherein placing the filter in the on-path position is used to communicate a first binary state, and placing the filter in the off-path position is used to communicate a second binary state.

29. A method according to claim 26, further comprising the acts of:
providing a pair of path length modules, each of the path length modules having an input and an output and defining a path length therebetween, the path lengths of the path length modules being substantially identical to one another and hidden from an observer of the path length modules; and
arranging the path length modules so that particles travelling from the information particle source to the filter pass through one of the modules and particles travelling from the information particle source to the detection arrangement pass through the other of the modules.

30. A method according to claim 26, further comprising the act of providing a second filter and a second detection arrangement arranged as a duplex channel.

31. A method according to claim 30, further comprising the acts of:
receiving, at the location of the first detection arrangement and the second filter, information from the location of the second detection arrangement and the first filter; and transmitting a confirmation signal to the location of the second detection arrangement and the first filter within a pre-set length of time after receiving the information.

32. A method according to claim 26, comprising the act of transmitting encrypted information.

33. A method according to claim 26, wherein the manipulation arrangement is arranged such that if a particle in a superposition of values of the parameter impinges on the splitter and a wavefunction of the particle is directed along both the first and second paths, the manipulation arrangement will act on the wavefunction to allow interference, at or near the detector, between the portions of the wavefunction that were directed along the first and second paths.

34. A method for transmitting information comprising the acts of:
providing a filter configured only to absorb particles that are incident thereon;
providing a detection system operable to distinguish between an incident particle having a relatively short coherence length and an incident particle having a relatively long coherence length, the detection system comprising a splitter and a detector, first and second paths being defined between the splitter and the detector, a path length of the first path being longer than a path length of the second path, the system being arranged such that, if a particle impinges on the splitter and a wavefunction of the particle is directed along both the first and second paths, the portions of the wavefunction that were directed along the first and second paths are allowed to interfere with one another at or before the detector;
providing an information particle source operable to emit particle pairs, one particle in each pair being directed towards the filter and the other particle in each pair being directed towards the detection arrangement; and
moving the filter between an on-path position, in which the one particle in each particle pair passes though the filter, and an off-path position, in which the one particle in each particle pair does not pass though the filter.

35. A method according to claim 34, wherein the act of providing an information particle source comprises providing a sample of a material having at least a three-level atomic structure, one of the particles of a particle pair being emitted as an electron moves from a first level to a second level within the structure and the other one of the particles of the particle pair being emitted as the electron moves from the second level to a third level within the structure.

36. A method according to claim 34, wherein the path length from the information particle source to the filter is less than the path length from the information particle source to the detection arrangement.

37. A method according to claim 34, wherein placing the filter in the on-path position is used to communicate a first binary state, and placing the filter in the off-path position is used to communicate a second binary state.

38. A method according to claim 34, further comprising the acts of:
providing a pair of path length modules, each of the path length modules having an input and an output and defining a path length therebetween, the path lengths of the path length modules being substantially identical to one another and hidden from an observer of the path length modules; and
arranging the path length modules so that particles travelling from the information particle source to the filter pass through one of the modules and particles travelling from the information particle source to the detection arrangement pass through the other of the modules.

39. A method according to claim 34, further comprising the act of providing a second filter and a second detection arrangement arranged as a duplex channel.

40. A method according to claim 39, further comprising the acts of:
receiving, at the location of the first detection arrangement and the second filter, information from the location of the second detection arrangement and the first filter; and
transmitting a confirmation signal to the location of the second detection arrangement and the first filter within a pre-set length of time after receiving the information.

41. A method according to claim 34, comprising the act of transmitting encrypted information.

* * * * *